UNITED STATES PATENT OFFICE.

JACOB ELLIOTT, OF HASTINGS, ENGLAND.

COMPOSITION OF MATTER FOR ARTIFICIAL STONE.

SPECIFICATION forming part of Letters Patent No. 435,485, dated September 2, 1890.

Application filed October 15, 1888. Serial No. 288,099. (No specimens.) Patented in England February 15, 1884, No. 3,363.

*To all whom it may concern:*

Be it known that I, JACOB ELLIOTT, a subject of the Queen of Great Britain, residing at Hastings, in the county of Sussex, England, have invented a new and useful Composition of Matter for Artificial-Stone Paving-Slabs and Slabs and Blocks for Building Purposes, (for which I have obtained Letters Patent in Great Britain, No. 3,363, dated February 15, 1884,) of which the following is a specification.

This invention relates to an improved composition of matter useful for many purposes—such, for instance, as in the manufacture of artificial-stone paving-slabs and slabs and and blocks for building purposes—and whereby I produce such slabs or blocks with extremely hard surfaces and very durable.

In practicing my invention I take Kentish-rag, Portland or York stone, and Bath-stone dust, very finely sifted, soaked in water, and mixed with Portland cement in the proportion of about two parts of the stone-dust mixture to about three parts of Portland cement stiffly gaged. The above-named proportions are those which I have found to give good results in practice; but they may be varied without departing from my invention, as will be well understood. This composition, when sufficiently set, may have its surface smoothed or leveled by means of a trowel or striking-edge, or its surface may be suitably roughened, particularly when it is used as the wearing or outer surface of slabs or blocks where there is a deep gradient.

I find my improved composition very valuable as a facing or top layer in the manufacture of slabs, blocks, &c., the main body of which may be made of any suitable coarser composition, or in which any successive layer is of other or finer materials than those composing the layer next beneath it.

By way of illustration I would state that I have found that a most valuable article is produced by using my composition, as follows: I take a quantity of bowlders from the sea-shore, and fire-brick, or Portland or York stone, the said materials being preferably crushed separately, (and washed, where necessary.) I then take about equal proportions of crushed bowlder and crushed fire-brick (or of Portland or York stone) and mix them all together, and then place the mixture in vats containing water. When it is well soaked, I remove it or well gage it with Portland cement in the proportion of about five parts of the crushed mixture to two parts of the Portland cement, sufficient clear water only being added to make them combine together. This compound for the body of the slab or block is then placed in suitable molds to the required depth, and after being well pressed down and leveled I then apply a first facing, prepared as follows: I take crushed Kentish-rag, Portland, or York stone, sifted through a sieve having about a three-sixteenths-of-an-inch mesh, and, the dust having been removed, the crushed and sifted stone is well soaked, and, the superfluous water having been removed, it is mixed with about an equal proportion of Portland cement gaged stiffly and placed or spread upon the surface of the body material in the mold. Over this first facing I then apply while wet the mixture first above described and forming the subject-matter of this application. When sufficiently set, the face is finished by being smoothed and leveled by means of a trowel or striking-edge, or the surface may be suitably roughened, particularly when the slabs are to be used for steep gradients. These compound blocks or slabs are left in the molds until they are set sufficiently to allow of their removal, which usually takes place in about three days, and after being left to set for a few days are placed in water for about twenty-four hours. They are then removed and placed in the open air to harden. It will be obvious that the facings should be applied before the surfaces become set.

In using my improved composition in manufacturing blocks or slabs other than paving slabs or blocks I proceed substantially in the manner above described, the facings being applied to such surfaces of the body as are required or as will be exposed. The thickness of the body and of the facings will naturally vary, according to requirements; but I have found that for paving-slabs of two and one-half inches in thickness the facings ...ould be about one-fourth inch for the first and one-eighth inch for the last or other one, while for blocks or slabs for other purposes the facings may be of less thickness.

I claim—

The described composition, suitable for and the manufacture of artificial-stone paving-slabs or as blocks and slabs for builders' purposes, &c., consisting of Kentish-rag, Portland or York stone, finely-sifted Bath-stone dust and water, mixed with Portland cement, in the proportion substantially as set forth.

JACOB ELLIOTT.

Witnesses:
G. F. REDFERN,
JOHN E. BONFIELD.